United States Patent
Reder et al.

(10) Patent No.: US 11,016,921 B2
(45) Date of Patent: May 25, 2021

(54) APPLIANCES AND METHODS FOR OFF-BOARD DATA STORAGE

(71) Applicant: Haier US Appliance Solutions, Inc., Wilmington, DE (US)

(72) Inventors: Andrew L. Reder, Louisville, KY (US); Paul Goodjohn, Crestwood, KY (US); Timothy D. Worthington, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/662,480

(22) Filed: Oct. 24, 2019

(65) Prior Publication Data
US 2021/0124704 A1    Apr. 29, 2021

(51) Int. Cl.
*G06F 13/40* (2006.01)
*G05B 19/12* (2006.01)

(52) U.S. Cl.
CPC ......... *G06F 13/4027* (2013.01); *G05B 19/12* (2013.01); *G05B 2219/25252* (2013.01); *G05B 2219/2642* (2013.01)

(58) Field of Classification Search
CPC .............. G06F 13/4027; G05B 19/12; G05B 2219/2642; G05B 2219/25252; G05B 2219/2638
See application file for complete search history.

(56) References Cited

U.S. PATENT DOCUMENTS

| | | | | |
|---|---|---|---|---|
| 8,040,234 | B2* | 10/2011 | Ebrom | H04L 12/2814 340/531 |
| 8,140,190 | B2* | 3/2012 | Ferragut, II | F25D 29/00 700/275 |
| 8,725,299 | B2* | 5/2014 | Hess | G05B 15/02 700/276 |
| 9,759,435 | B2* | 9/2017 | Jewell | F24F 1/022 |
| 10,665,091 | B2* | 5/2020 | Nakamura | H03K 7/08 |
| 10,791,001 | B2* | 9/2020 | Brian | H04L 67/025 |
| 2017/0242996 | A1* | 8/2017 | Kang | G06F 21/34 |
| 2017/0344451 | A1 | 11/2017 | Vanderah et al. | |
| 2018/0100674 | A1* | 4/2018 | Eicher | F24F 3/1405 |
| 2019/0187638 | A1* | 6/2019 | Arrojula | G05B 15/02 |
| 2020/0025405 | A1* | 1/2020 | Paez | F24F 1/0018 |

FOREIGN PATENT DOCUMENTS

| | | |
|---|---|---|
| GB | 2283344 A | 5/1995 |
| JP | 04966326 B2 | 7/2012 |

* cited by examiner

*Primary Examiner* — Brian T Misiura
(74) *Attorney, Agent, or Firm* — Dority & Manning, P.A.

(57) ABSTRACT

An appliance, as provided herein, may include a cabinet, a control board, an intermediate dongle, and an electrical feature. The control board may be mounted within the cabinet to selectively direct one or more operation of the appliance. The intermediate dongle may be spaced apart from the control board within the cabinet. The intermediate dongle may include a connector body and a memory device housed within the connector body. The intermediate dongle may be in electrical communication with the control board. The electrical feature may be connected to the intermediate dongle within the cabinet of the appliance. The electrical feature may be in electrical communication with the control board through the intermediate dongle.

17 Claims, 6 Drawing Sheets

APPLIANCES AND METHODS FOR OFF-BOARD DATA STORAGE

FIELD OF THE INVENTION

The present subject matter relates generally to appliances, and more particularly to appliances and methods for storing appliance data off of an internal control board.

BACKGROUND OF THE INVENTION

Appliances, such as air conditioner appliances, refrigerator appliances, oven appliances, microwave appliances, dishwasher appliances, water heater appliances, etc., generally include one or more components for directing operation of a given appliance. For example, an appliance may include a controller having a printed circuit board (i.e., control board) that is connected to a control pad or panel. Through programmed instructions and input from the control pad, the controller may work with the other components of the appliance to direct operations thereof.

In order to service multiple and varied appliances, it is often important to uniquely identify each appliance. Certain functions may be common to multiple different models, but different models may also have functions that are not common between them. In other words, there may be a number of variations between different consumer appliances of the same type (e.g., two or more refrigerator appliance models). Between different types of appliances (e.g., a refrigerator appliance model and an oven appliance model), even more variations may exist. Over time, even identical models of an appliance (e.g., appliances having the same model number) may have variations between them (e.g., different versions of software installed on the controller of each respective appliance). Each of these variations may or may not influence how a service professional can interact with a given appliance.

Although certain elements are common to multiple different appliances or models of an appliance, many elements and features can vary between different appliances or models of an appliance. The operation or functionality of even the common elements shared by multiple models of air conditioner units may be affected by the presence or variations of certain elements. In order to address such variations, the control board of an appliance is generally programmed with a specific personality (e.g., relating to one or more modes of operation) that is tailored to that same appliance or model of appliance.

In some instances, it may be necessary to replace the control board of a particular appliance. For example, it is possible that the original (e.g., factory-installed) control board may be damaged or broken after the appliance is installed (e.g., within a dwelling or office building). In response, a repairman or service professional will often remove the damaged or broken control board and install a new replacement control board (i.e., substitute control board). Since a service professional is likely to encounter numerous different models of appliances, a single substitute control board may include multiple different personalities (e.g., discrete personalities that correspond to different appliances or models of an appliance). During installation of the new replacement control board, the service professional will generally select a specific personality according to which appliance or model of an appliance the control board is being installed into.

Although it may be desirable to have multiple different personalities on a single substitute control board, this presents some difficulties. For instance, the service professional is typically being relied upon to know the exact model into which the substitute control board is being installed. Moreover, the service professional is typically being relied upon to choose the correct personality. If the service professional is incorrect in either instance, the appliance unit may fail to operate as intended.

Separate from or in addition to the identification and personality of an appliance, it can be important for a service professional to know certain historical information on how the appliance has operated (e.g., past fault codes, run times, selected settings, etc.). Often a user cannot provide such information. Attempts have been made to record such information on the control board, but the information can be lost if a control board is replaced or damaged.

As a result, there is a need for improved air conditioner units or methods to address one or more of the above identified issues.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an appliance is provided. The appliance may include a cabinet, a control board, an intermediate dongle, and an electrical feature. The control board may be mounted within the cabinet to selectively direct one or more operation of the appliance. The intermediate dongle may be spaced apart from the control board within the cabinet. The intermediate dongle may include a connector body and a memory device housed within the connector body. The intermediate dongle may be in electrical communication with the control board. The electrical feature may be connected to the intermediate dongle within the cabinet of the appliance. The electrical feature may be in electrical communication with the control board through the intermediate dongle.

In another exemplary aspect of the present disclosure, a method of operating an appliance is provided. The method may include detecting an electrical path between a control board and an intermediate dongle. The method may further include transferring data between the control board and the intermediate dongle along the electrical path. The method may still further include directing an electrical current from the control board to the intermediate dongle along the electrical path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The phrase "in one embodiment," does not necessarily refer to the same embodiment, although it may. The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Referring now to the figures, in FIGS. 1 through 5, exemplary appliances will be disclosed and discussed in the context of an air conditioner unit 10. The air conditioner unit 10 is generally a one-unit type air conditioner, also conventionally referred to as a room air conditioner or package terminal air conditioner unit. The unit 10 includes an indoor portion 12 and an outdoor portion 14, and defines a vertical direction V, a lateral direction L, and a transverse direction T. Each direction V, L, T is perpendicular to each other, such that an orthogonal coordinate system is generally defined.

Although an exemplary appliance is described in the context of air conditioner appliance 10, the exemplary embodiments of air conditioner appliance 10 are merely illustrative and non-limiting. As is understood, the present disclosure may include, or be applied to, any suitable appliance, such as a refrigerator appliance, an oven appliance, a microwave appliance, a dishwasher appliance, a washing machine appliance, a dryer appliance, water heater appliance, or another style/model of air conditioner appliance. Such appliances may generally include a cabinet housing one or more electrical features, such as an appliance component (e.g., a compressor, heating element, motor, air blower, etc.) or an internal sensor (e.g., temperature sensor, pressure sensor, accelerometer, gyroscope, etc.).

As illustrated in FIGS. 1 through 5, certain exemplary embodiments of unit 10 include elements or features that are absent from other exemplary embodiments of unit 10. In other words, multiple discrete models of air conditioner unit are provided as unique exemplary embodiments. One exemplary embodiment may be described herein as a heat pump unit (e.g., configured to operate a sealed refrigeration system alternately in a cooling cycle and a heating cycle). Another exemplary embodiment may be described herein as an A/C exclusive unit (e.g., configured to operate a sealed cooling system exclusively in cooling cycle). An additional or alternative embodiment may be described herein as a low voltage unit (e.g., configured to operate at a relatively low voltage, such as 230 V). Yet another additional or alternative embodiment may be described herein as a high voltage unit (e.g., configured to operate at a relatively high voltage, such as 265 V).

Generally, a cabinet 20 of the unit 10 contains various other components of the unit 10. Cabinet 20 may include, for example, a rear grill 22 and a room front 24 that may be spaced apart along the transverse direction T by a wall sleeve 26. The rear grill 22 may be part of the outdoor portion 14, while the room front 24 is part of the indoor portion 12. Components of the outdoor portion 14, such as an outdoor heat exchanger 30, outdoor fan 33 (FIG. 5), and compressor 32 may be housed within the wall sleeve 26. A casing 34 may additionally enclose the outdoor fan 33, as shown.

Indoor portion 12 may include, for example, an indoor heat exchanger 40, a blower fan 42, and a heating unit 44. These components may, for example, be housed behind the room front 24. Additionally, a bulkhead 46 may generally support or house various other components or portions thereof of the indoor portion 12, such as the blower fan 42 and the heating unit 44. Bulkhead 46 may generally separate and define the indoor portion 12 and outdoor portion 14.

Outdoor and indoor heat exchangers 30, 40 may be components of a thermodynamic assembly (i.e., sealed system), which may be operated as a refrigeration assembly (and thus perform a refrigeration cycle) and, in the case of the heat pump unit embodiment, a heat pump (and thus perform a heat pump cycle). Thus, as is understood, exemplary heat pump unit embodiments may be selectively operated perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in a cooling mode).

Figure 5:
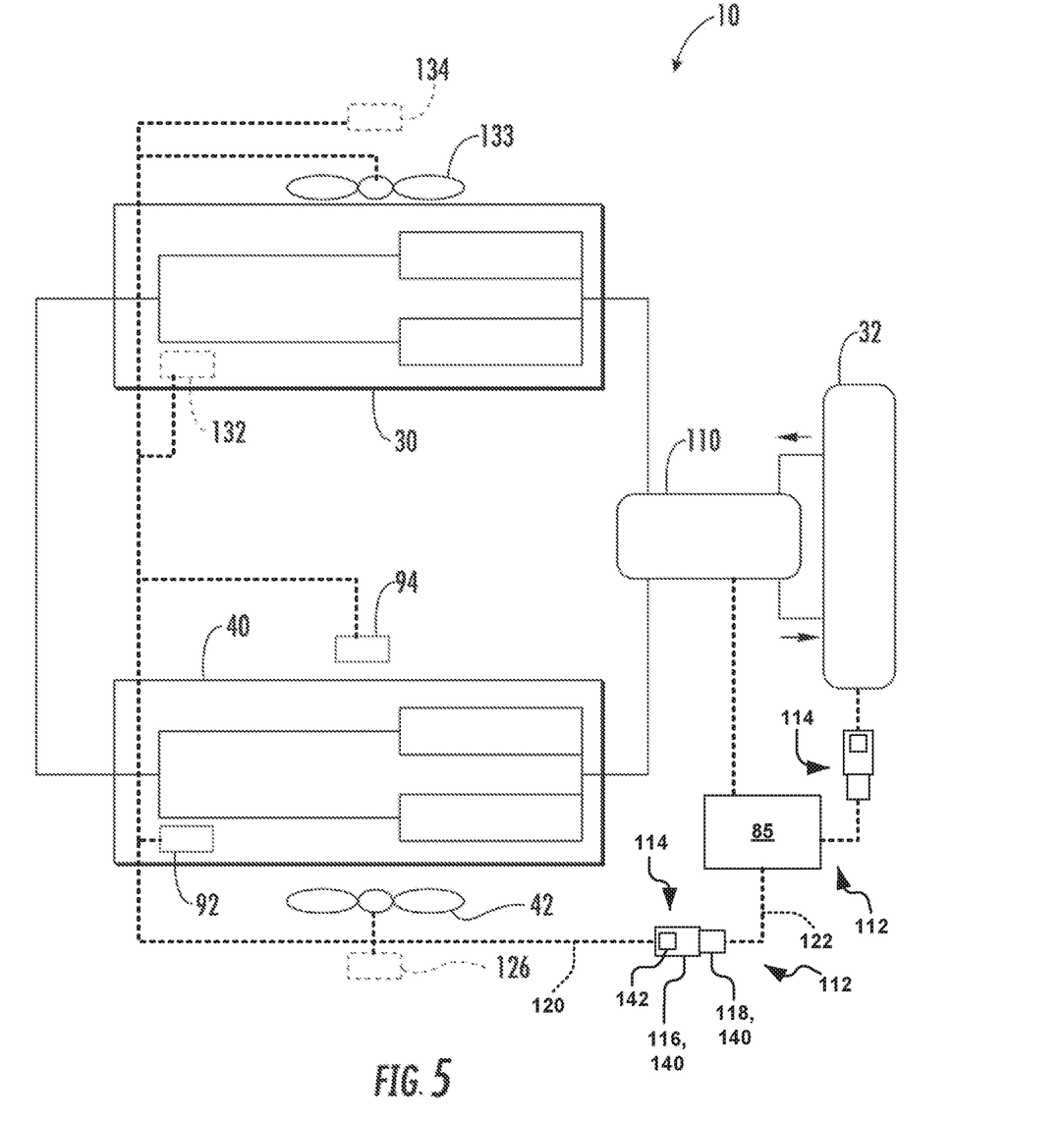
FIG. 5 provides a schematic view of an air conditioner unit according to exemplary embodiments of the present disclosure.

In optional embodiments, such as exemplary heat pump unit embodiments, the sealed system includes a reversible refrigerant valve 110 (FIG. 5). Reversible refrigerant valve 110 selectively directs compressed refrigerant from compressor 32 to either indoor heat exchanger 40 or outdoor heat exchanger 30. For example, in a cooling mode, reversible refrigerant valve 110 is arranged or configured to direct compressed refrigerant from compressor 32 to outdoor heat exchanger 30.

Conversely, in a heating mode, reversible refrigerant valve 110 is arranged or configured to direct compressed refrigerant from compressor 32 to indoor heat exchanger 40. Thus, reversible refrigerant valve 110 permits the sealed system to adjust between the heating mode and the cooling mode, as will be understood by those skilled in the art.

The assembly may, for example, further include compressor 32 and an expansion valve, both of which may be in fluid communication with the heat exchangers 30, 40 to flow refrigerant therethrough, as is generally understood. Optionally, the compressor 32 may be a variable speed compressor or, alternatively, a single speed compressor. When the assembly is operating in a cooling mode, and thus performs a refrigeration cycle, the indoor heat exchanger 40 acts as an evaporator and the outdoor heat exchanger 30 acts as a condenser. In heat pump unit embodiments, when the assembly is operating in a heating mode, and thus performs a heat pump cycle, the indoor heat exchanger 40 acts as a condenser and the outdoor heat exchanger 30 acts as an evaporator. The outdoor and indoor heat exchangers 30, 40 may each include coils 31, 41, as illustrated, through which a refrigerant may flow for heat exchange purposes, as is generally understood.

Bulkhead 46 may include various peripheral surfaces that define an interior 50 thereof. For example, and additionally referring to FIG. 3, bulkhead 46 may include a first sidewall 52 and a second sidewall 54 which are spaced apart from each other along the lateral direction L. A rear wall 56 may extend laterally between the first sidewall 52 and second sidewall 54. The rear wall 56 may, for example, include an upper portion 60 and a lower portion 62. Upper portion 60 may for example have a generally curvilinear cross-sectional shape, and may accommodate a portion of the blower fan 42 when blower fan 42 is housed within the interior 50. Lower portion 62 may have a generally linear cross-sectional shape, and may be positioned below upper portion 60 along the vertical direction V. Rear wall 56 may further include an indoor facing surface 64 and an opposing outdoor facing surface. The indoor facing surface 64 may face the interior 50 and indoor portion 12, and the outdoor facing surface 66 may face the outdoor portion 14.

Bulkhead 46 may additionally extend between a top end 61 and a bottom end 63 along vertical axis V. Upper portion 60 may, for example, include top end 61, while lower portion 62 may, for example, include bottom end 63.

Bulkhead 46 may additionally include, for example, an air diverter 68, which may extend between the sidewalls 52, 54 along the lateral direction L and through which air may flow.

In exemplary embodiments, blower fan 42 may be a tangential fan. Alternatively, however, any suitable fan type may be utilized. Blower fan 42 may include a blade assembly 70 and a motor 72. The blade assembly 70, which may include one or more blades disposed within a fan housing 74, may be disposed at least partially within the interior 50 of the bulkhead 46, such as within the upper portion 60. As shown, blade assembly 70 may for example extend along the lateral direction L between the first sidewall 52 and the second sidewall 54. The motor 72 may be connected to the blade assembly 70, such as through the housing 74 to the blades via a shaft. Operation of the motor 72 may rotate the blades, thus generally operating the blower fan 42. Further, in exemplary embodiments, motor 72 may be disposed exterior to the bulkhead 46. Accordingly, the shaft may for example extend through one of the sidewalls 52, 54 to connect the motor 72 and blade assembly 70.

In exemplary embodiments, heating unit 44 includes one or more heater banks 80. Each heater bank 80 may be operated as desired to produce heat. In some embodiments, three heater banks 80 may be utilized, as shown. Alternatively, however, any suitable number of heater banks 80 may be utilized. Each heater bank 80 may further include at least one heater coil or coil pass 82, such as in exemplary embodiments two heater coils or coil passes 82. Alternatively, other suitable heating elements may be utilized. As is understood, each heater coil pass 82 may be provided as a resistive heating element configured to generate heat in response to resistance to an electrical current flowed therethrough.

The operation of air conditioner unit 10 including compressor 32 (and thus the sealed system generally) blower fan 42, fan 33, heating unit 44, and other suitable components may be controlled by a control board or controller 85. In other words, controller 85 may generally be configured to direct operation of unit 10. Controller 85 may be in communication (via for example a suitable wired or electrical connection) to such components of the air conditioner unit 10. By way of example, the controller 85 may include a memory and one or more processing devices such as microprocessors, CPUs or the like, such as general or special purpose microprocessors operable to execute programming instructions or micro-control code associated with operation of unit 10. The memory may be a separate component from the processor or may be included onboard within the processor. The memory may represent random access memory such as DRAM, or read only memory such as ROM or FLASH. Generally, the processor executes programming instructions stored in memory. For instance, a set of programming instructions may correspond to a specific personality stored in memory.

Various electrical features of unit 10 may be connected to controller 85 via one or more electrical harnesses 112. As an example, one or more components (e.g., compressor 32, valve 110, blower fan 42, fan 33, or heating unit 44) may be electrically connected or coupled to controller 85 through a corresponding harness 112. Such harnesses 112 may include multiple conductive wires that can be selectively coupled (e.g., mechanically and electrically coupled) through a mated dongle set 114. Generally, such a mated dongle set 114 includes an intermediate dongle 116 that couples to a secondary dongle 118. Specifically, the intermediate dongle 116 and secondary dongle 118 each include a discrete connector body 140 that forms a selectively-separable mechanical and electrical connection. The connection that couples the two dongles 116, 118 may be a port-plug relationship such that one dongle is at least partially received within the other (e.g., similar to a coupled RJ45 terminal/jack and plug).

When the dongles are connected or coupled together, a power current or data signal may be transmitted through the mated dongle set 114. Each of the dongles may be joined to a separate wire segment. For instance, intermediate dongle 116 may be joined to a first wire segment 120 extending along (e.g., defining at least a portion of) the electrical path between intermediate dongle 116 and a corresponding electrical feature. Secondary dongle 118 may be joined to a second wire segment 122 extending along (e.g., defining at least portion of) the electrical path between secondary dongle 118 and controller 85. Thus, when assembled, intermediate dongle 116 is disposed in electrical communication between at least one corresponding electrical feature and controller 85. Additionally or alternatively, secondary dongle 118 may be disposed in electrical communication between intermediate dongle 116 and controller 85. Moreover, intermediate dongle 116 may be spaced apart from controller 85 (e.g., not fixedly attached to or integrated therewith) such that controller 85 may be selectively removed from cabinet 20 without simultaneously removing intermediate dongle 116.

Unit 10 may additionally include a control panel 87 and one or more user inputs 89, which may be included in control panel 87. The user inputs 89 may be in communication with the controller 85. A user of the unit 10 may interact with the user inputs 89 to operate the unit 10, and user commands may be transmitted between the user inputs 89 and controller 85 to facilitate operation of the unit 10 based on such user commands. A display 88 may additionally be provided in the control panel 87, and may be in communication with the controller 85. Display 88 may, for example be a touchscreen or other text-readable display screen, or alternatively may simply be a light that can be activated and deactivated as required to provide an indication of, for example, an event or setting for the unit 10.

In exemplary embodiments, a first indoor temperature sensor 92 (e.g., indoor refrigerant temperature sensor) and a second indoor temperature sensor 94 (e.g., indoor ambient temperature sensor) may be disposed within the indoor portion 12. In some embodiments, such as exemplary high voltage unit embodiments, a third indoor temperature sensor 126 (e.g., indoor outlet temperature sensor) (as indicated in phantom lines) is disposed within the indoor portion 12. Optionally, other embodiments, such as exemplary low voltage unit embodiments, will be free of any such third indoor temperature sensor 126. Each temperature sensor may be configured to sense the temperature of its surroundings. For example, each temperature sensor may be a thermistor or a thermocouple. The indoor temperature sensors 92, 94, 126 may be in communication with the controller 85, and may transmit temperatures sensed thereby to the controller 85 (e.g., as one or more voltages or data signals, which the controller 85 is configured to interpret as temperature readings).

Figure 1:
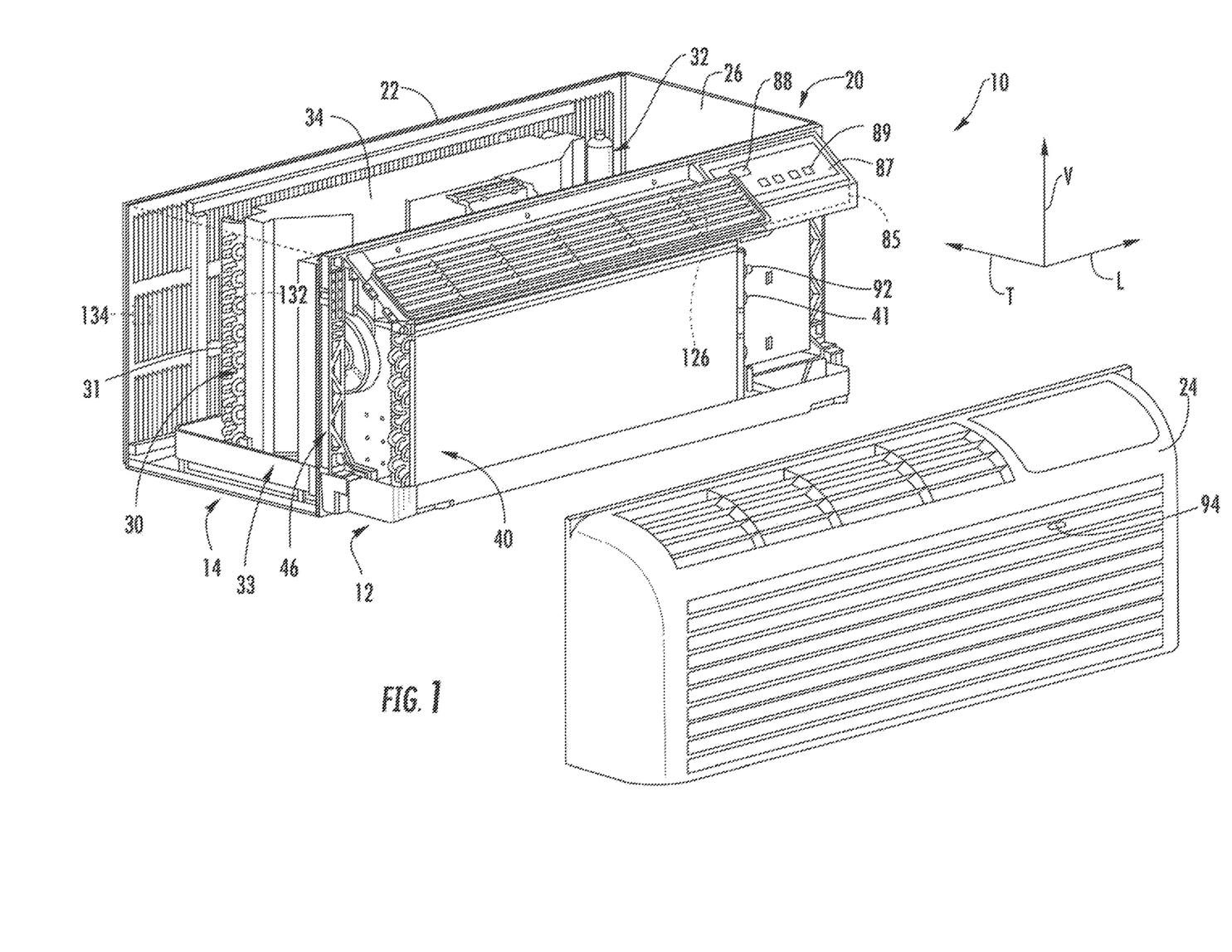
FIG. 1 provides a perspective view of an appliance including an air conditioner unit, with a room front exploded from a remainder of the air conditioner unit for illustrative purposes, according to with exemplary embodiments of the present disclosure.
Figure 2:
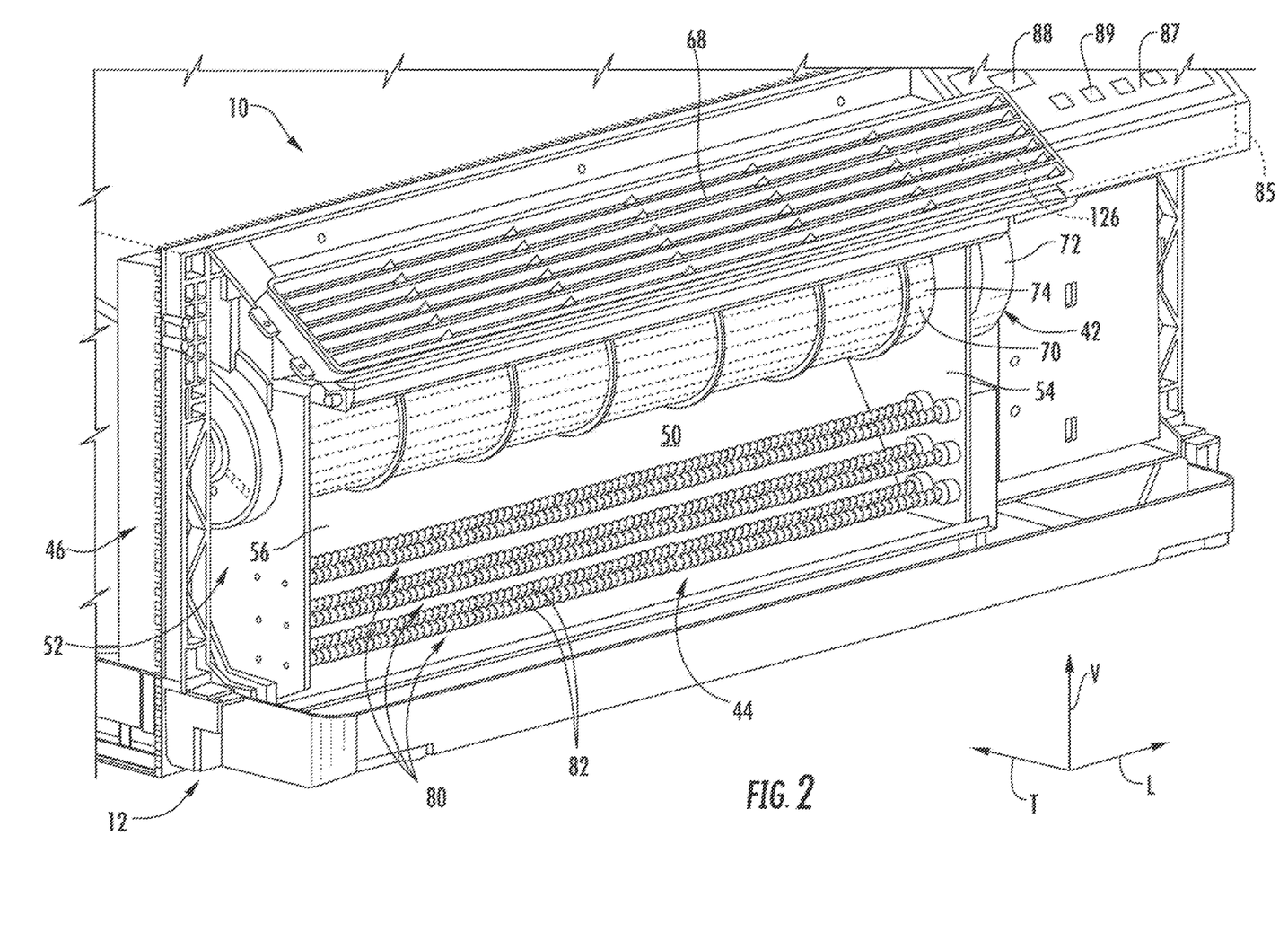
FIG. 2 is a perspective view of components of an indoor portion of an air conditioner unit according to with exemplary embodiments of the present disclosure.
Figure 3:
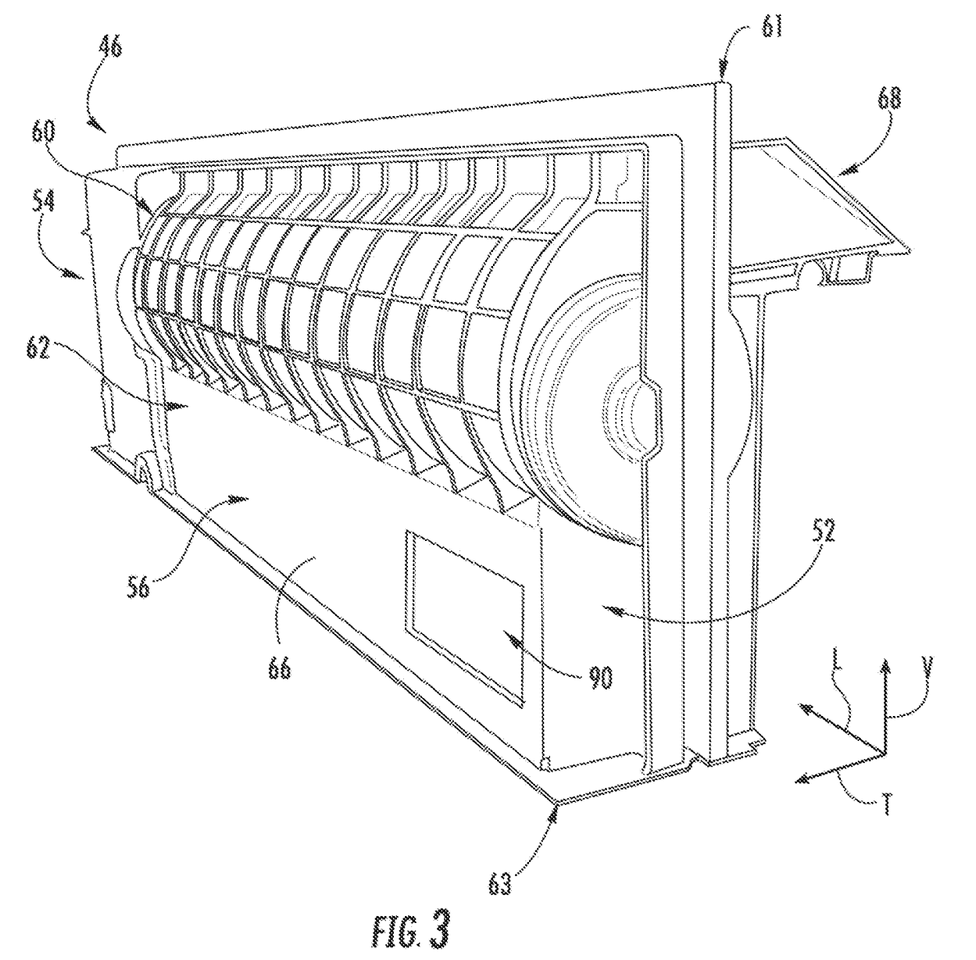
FIG. 3 is a rear perspective view of a bulkhead assembly according to with exemplary embodiments of the present disclosure.
Figure 4:
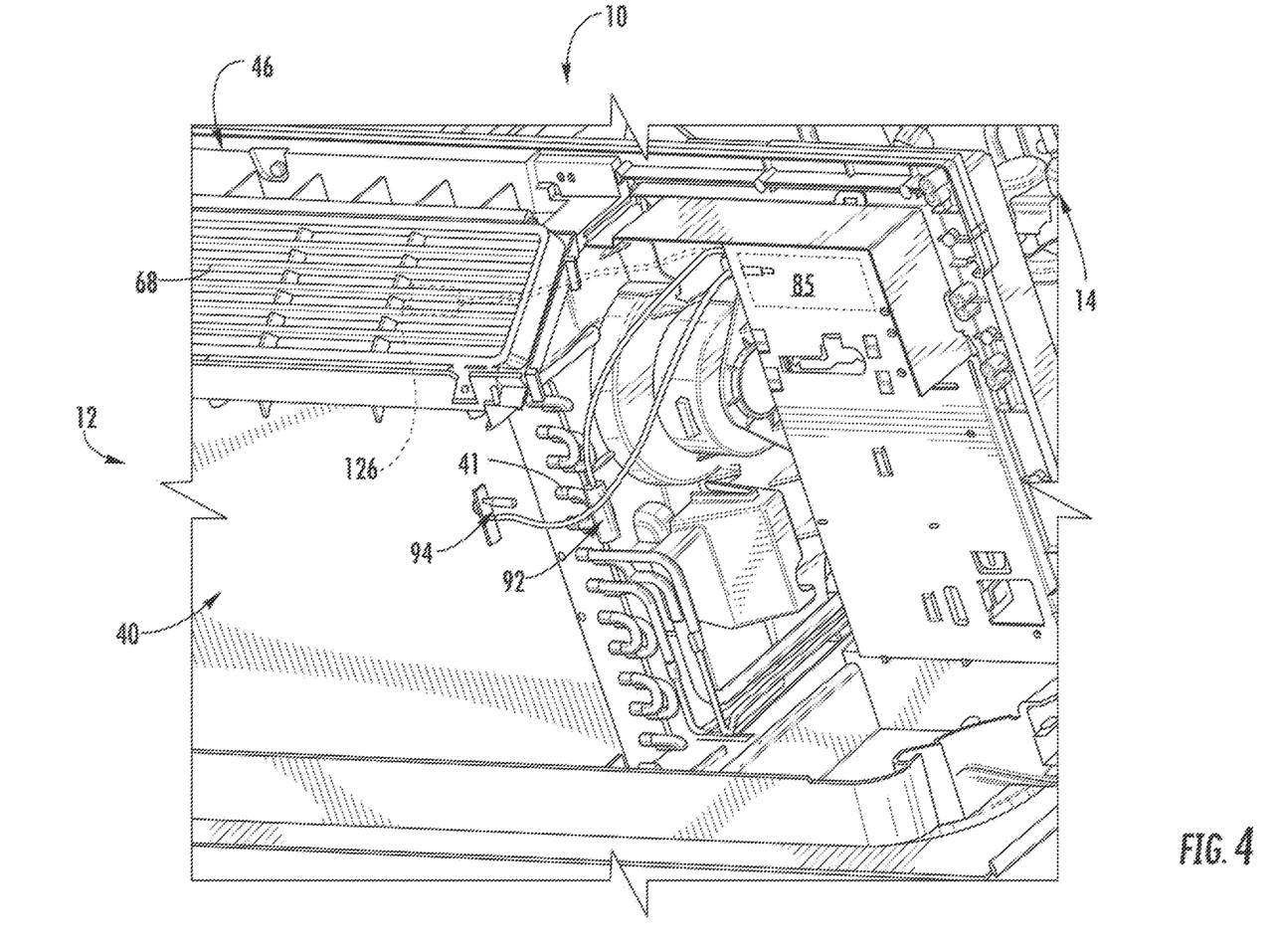
FIG. 4 is another perspective view of components of an indoor portion of an air conditioner unit according to with exemplary embodiments of the present disclosure.

First indoor temperature sensor 92 may be disposed proximate the indoor heat exchanger 40 (such as relative to the second indoor temperature sensor 94). For example, in some embodiments, first indoor temperature sensor 92 may be in contact with the indoor heat exchanger 40, such as with a coil 41 thereof. The first indoor temperature sensor 92 may be configured to detect a temperature for the indoor heat exchanger 40. Second indoor temperature sensor 94 may be spaced from the indoor heat exchanger 40, such as in the transverse direction T. For example, the second indoor temperature sensor 94 may be in contact with the room front 24, as illustrated in FIG. 1. Second indoor temperature sensor 94 may be configured to detect a temperature of air entering the indoor portion 12. Third indoor temperature sensor 126 may be spaced apart from and disposed downstream of both the first indoor temperature sensor 92 and the second indoor temperature sensor 94. For example, the third indoor temperature sensor 126 may be attached to or in contact with the air diverter 68. The third indoor temperature sensor 126 may be configured to detect a temperature for air exiting the indoor portion 12. During certain operations (e.g., cooling operations), air may thus generally flow across or adjacent to the second indoor temperature sensor 94, the first indoor temperature sensor 92, and then the third indoor temperature sensor 126.

In optional embodiments, such as exemplary heat pump unit embodiments, a first outdoor temperature sensor 132 (e.g., outdoor refrigerant temperature sensor) (as indicated in phantom lines) and a second outdoor temperature sensor 134 (e.g., outdoor ambient temperature sensor) (as indicated in phantom lines) are disposed within the outdoor portion 14. Each temperature sensor may be configured to sense the temperature of its surroundings. For example, each temperature sensor may be a thermistor or a thermocouple. The outdoor temperature sensors 132, 134 may be in communication with the controller 85, and may transmit temperatures sensed thereby to the controller 85 (e.g., as one or more voltage signals, which the controller 85 is configured to interpret as temperature readings).

First outdoor temperature sensor 132 may be disposed proximate the outdoor heat exchanger 30 (such as relative to the second outdoor temperature sensor 134). For example, in some embodiments, first outdoor temperature sensor 132 may be in contact with the outdoor heat exchanger 30, such as with a coil 31 (FIG. 1) thereof. The first outdoor temperature sensor 132 may be configured to detect a temperature for the outdoor heat exchanger 30. Second outdoor temperature sensor 134 may be spaced from the outdoor heat exchanger 30, such as in the transverse direction T. For example, the second outdoor temperature sensor 134 may be in contact with the rear grill 22 (FIG. 1). The second outdoor temperature sensor 134 may be configured to detect a temperature for air entering the outdoor portion 14. During certain operations (e.g., heating operations), air may thus generally flow across or adjacent to the second outdoor temperature sensor 134 and then the first outdoor temperature sensor 132.

In some embodiments, intermediate dongle 116 includes a memory device 142 (e.g., housed within the corresponding connector body 140). Such a memory device 142 may include non-volatile or read-only memory, such as electrically erasable programmable read-only memory (i.e., EEPROM). Generally, memory device 142 is separate from the memory of controller 85. Nonetheless, when assembled, memory device 142 may be in communication (e.g., electrical communication) with controller 85. For instance, data may be transferred between memory device 142 and controller 85. Specifically, memory device 142 may transmit/receive one or more with voltage signals to/from controller 85 (e.g., through second wire segment 122 or secondary dongle 118). The data signals between memory device 142 and controller 85 may provide or include transferred data. The transferred data may include a recorded log data set (e.g., providing data or information regarding performance of a particular appliance unit), personality setting (e.g., providing preset programming instructions or constants for executing operations of a particular appliance unit), or a unit identifier (e.g., providing a code or identification characters detailing the appliance type or model of a particular appliance unit).

In some embodiments, it may be advantageous for the memory device 142 to collect or store relevant information regarding performance of the corresponding appliance unit (e.g., unit 10). Such information may be provided as a log data set including historical performance data, such as cumulative run times of one or more components (e.g., fans 33, 42 or compressor 32), activation deactivation history for one or more components (e.g., fans 33, 42 or compressor 32), past or average detected conditions from a sensor (e.g., temperatures detected at temperature sensor 92, 94, 125, or 132) a fault code generated at the controller 85, etc. As data (e.g., log data set) is generated or received at the controller 85, the controller 85 may transfer the log data set to the memory device 142. Advantageously, a service professional may thus trace the performance of an individual appliance unit (e.g., unit 10) by reading data from the intermediate dongle 116 (e.g., without requiring the controller 85). Moreover, any problems or errors within the unit 10 may be more easily identified.

In additional or alternative embodiments, a preset personality setting is provided within memory device 142. Generally, the preset personality setting may include constants or programming instructions (e.g., software) for operating unit 10. For instance, the preset personality setting may include instructions for rotation speed of the fans 33, 42 or, in the case of a variable speed compressor, compressor 32. The preset personality setting may be used as the operating personality setting for unit 10 (e.g., where no operating personality setting was previously provided on controller 85 or a previous operating personality setting was determined to be outdated). Thus, the rotation speed of the fans 33, 42 or compressor 32 may be determined, at least in part, by the one of the preset personality setting (e.g., the preset personality setting that is installed on controller 85 and acting as the operating personality setting of unit 10).

Optionally, the preset personality setting from the memory device 142 may be installed to replace an outdated operating personality setting on controller 85. For instance, controller 85 may determine that a current personality setting on the controller 85 is outdated in comparison to the preset personality setting. In response to such a determination, controller 85 may direct installation of the preset personality setting from the memory device 142.

In further additional or alternative embodiments, multiple discrete preset personalities (e.g., programming instructions) corresponding different appliances or models for embodiments of the unit 10 are provided within controller 85. For example, the controller 85 may be a substitute control board configured to automatically (e.g., without direct input or selections from the user or service professional) select or initiate one of the plurality of preset personalities as the operating personality for the unit 10 based on one or more detected signals. For instance, the controller 85 may select or initiate a specific preset setting based on a unit identifier received from the memory device 142 upon connecting intermediate dongle 116 to controller 85 (e.g., via secondary dongle 118 and second wire segment 122).

Each of the plurality of preset personalities may direct certain elements to operate uniquely (e.g., in response to a user selection or mode). For instance, each personality may include different settings for rotation speed of the fans 33, 42 or, in the case of a variable speed compressor, compressor 32. Thus, the rotation speed of the fans 33, 42 or compressor 32 may be determined, at least in part, by the one of the preset personality settings that is selected as the operating personality setting. For instance, rotation speeds of fans 33, 42 may generally be programmed as higher values (e.g., for any given setting of unit 10) in a high voltage unit embodiment than in a low voltage unit embodiment. Since certain exemplary embodiments may include features not found in other exemplary embodiments (e.g., a reversible refrigerant valve 110 provided in the exemplary heat pump unit embodiments, but not A/C exclusive unit embodiments), directing operation of this features may be determined by the one of the preset personality settings that is selected as the operating personality setting. In some embodiments, the plurality of preset personalities includes a heat pump personality, an A/C exclusive personality, a low voltage personality, or a high voltage personality.

Advantageously, intermediate dongle 116 may ensure the proper personality setting is provided to controller 85 (e.g., without requiring a decision or direct input from a user, service professional, or assembler).

Figure 6:
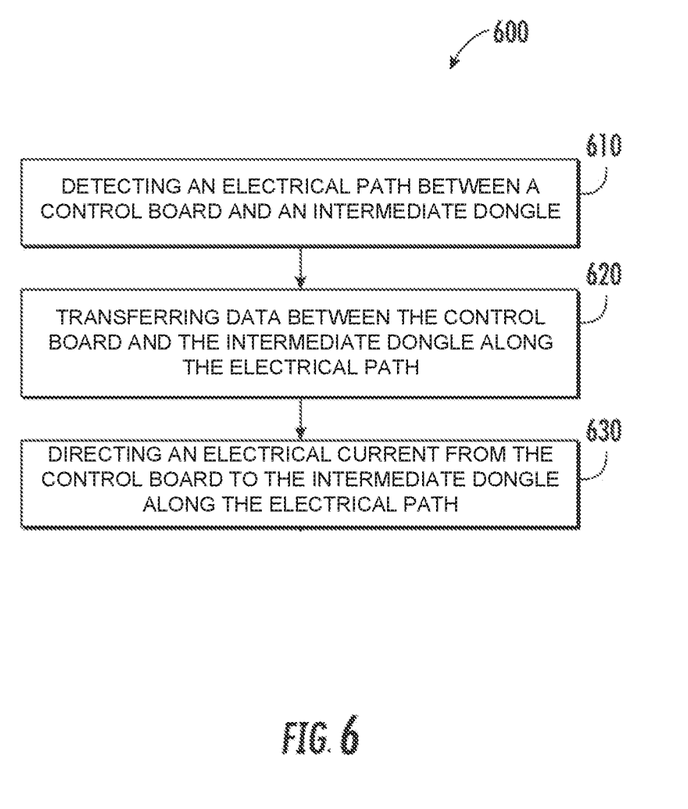
FIG. 6 provides a flow chart illustrating a method of operating an appliance according to exemplary embodiments of the present disclosure.

Referring now to FIG. 6, the present disclosure may further be directed to methods 600 of operating an exemplary appliance, such as (but not limited to) unit 10. For instance, the method 600 may provide a method of operating an air conditioning appliance, a refrigerator appliance, an oven appliance, a water heater appliance, a microwave appliance, a washing machine appliance, a dishwashing appliance, or a dryer appliance. In exemplary embodiments, the control board or controller 85 may be operable to perform various steps of a method in accordance with the present disclosure (e.g., as part of an internal operation).

As illustrated, at 610, the method 600 includes detecting an electrical path between the control board and the intermediate dongle. In other words, an electrical connection or electrical communication between the control board and the intermediate dongle may be detected. As an example, the control board may transmit a detection power current or data signal through a predetermined electrical path or harness. Following transmission of the detection power current, the control board may receive a response signal indicating the presence of a connection to the intermediate dongle. As an additional or alternative example, the control board may detect a programmed electrical condition along the predetermined electrical path (e.g., resistance rating) to indicate the connection between the control board and the intermediate dongle.

At 620, the method 600 includes transferring data between the control board and the intermediate dongle along the electrical path. The transmission of data may be from or to the control board. For instance, the transfer may include transmitting a data signal from the control board to the intermediate module. Additionally or alternatively, the transfer may include receiving a data signal from the intermediate module at the control board. As described above, the transferred data may include a recorded log data set, a personality setting, or a unit identifier. In some embodiments, the transferred data may prompt the control board to identifying an outdated personality setting on the control board and direct installation of a new preset personality setting from the intermediate dongle in response to identifying an outdated personality setting.

At 630, the method 600 includes directing an electrical current from the control board to the intermediate dongle along the electrical path. Specifically, the electrical current may pass through the intermediate dongle to power or activate an electrical feature (e.g., component or sensor), as described above. For instance, subsequent to 610 or 620, activation and operation of various electrical features may be directed by the controller (e.g., according to the operating personality setting).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
   a cabinet;
   a control board mounted within the cabinet to selectively direct one or more operation of the appliance;
   an intermediate dongle spaced apart from the control board within the cabinet, the intermediate dongle comprising a connector body and a memory device housed within the connector body, the intermediate dongle being in electrical communication with the control board;

an electrical feature connected to the intermediate dongle within the cabinet of the appliance, the electrical feature being in electrical communication with the control board through the intermediate dongle; and a secondary dongle spaced apart from the electrical feature and selectively coupled to the intermediate dongle in electrical communication between the control board and the intermediate dongle, wherein the intermediate dongle and the secondary dongle are coupled in a selectively separable port-plug relationship.

2. The appliance of claim 1, wherein the control board is configured to initiate an internal operation, the internal operation comprising detecting an electrical path between the control board and the intermediate dongle, transferring data between the control board and the intermediate dongle along the electrical path, and directing an electrical current from the control board to the intermediate dongle along the electrical path.

3. The appliance of claim 2, wherein transferring data comprises transmitting a data signal from the control board to the intermediate dongle.

4. The appliance of claim 2, wherein transferring data comprises receiving a data signal from the intermediate dongle at the control board.

5. The appliance of claim 2, wherein the transferred data includes a recorded log data set, a personality setting, or a unit identifier.

6. The appliance of claim 2, further comprising identifying an operating personality setting on the control board.

7. The appliance of claim 6, further comprising directing installation of a new preset personality setting from the intermediate dongle in response to identifying the operating personality setting on the control board.

8. The appliance of claim 1, wherein the appliance is an air conditioning appliance, a refrigerator appliance, an oven appliance, a microwave appliance, a washing machine appliance, a dishwashing appliance, a dryer appliance, or a water heater appliance.

9. The appliance of claim 1, wherein the memory device comprises an EEPROM.

10. A method of operating an appliance comprising a cabinet, a control board mounted within the cabinet, an intermediate dongle spaced apart from the control board within the cabinet in electrical communication with the control board, an electrical feature connected within the appliance in electrical communication with the control board through the intermediate dongle, and a secondary dongle spaced apart from the electrical feature and selectively coupled to the intermediate dongle in electrical communication between the control board and the intermediate dongle, wherein the intermediate dongle and the secondary dongle are coupled in a selectively separable port-plug relationship, the method comprising:

detecting an electrical path between the control board and the intermediate dongle through the secondary dongle;

transferring data between the control board and the intermediate dongle along the electrical path; and directing an electrical current from the control board to the intermediate dongle along the electrical path.

11. The method of claim 10, wherein transferring data comprises transmitting a data signal from the control board to the intermediate dongle.

12. The method of claim 10, wherein transferring data comprises receiving a data signal from the intermediate dongle at the control board.

13. The method of claim 10, wherein the transferred data includes a recorded log data set, a personality setting, or a unit identifier.

14. The method of claim 10, further comprising identifying an operating personality setting on the control board.

15. The method of claim 14, further comprising directing installation of a new preset personality setting from the intermediate dongle in response to identifying the operating personality setting on the control board.

16. The method of claim 10, wherein the appliance is an air conditioning appliance, a refrigerator appliance, an oven appliance, a microwave appliance, a washing machine appliance, a dishwashing appliance, a dryer appliance, or a water heater appliance.

17. The method of claim 10, wherein the memory device comprises an EEPROM.

* * * * *